April 6, 1926.
B. P. HANSON
1,579,528
MOTOR VEHICLE BUMPER
Filed Dec. 31, 1925
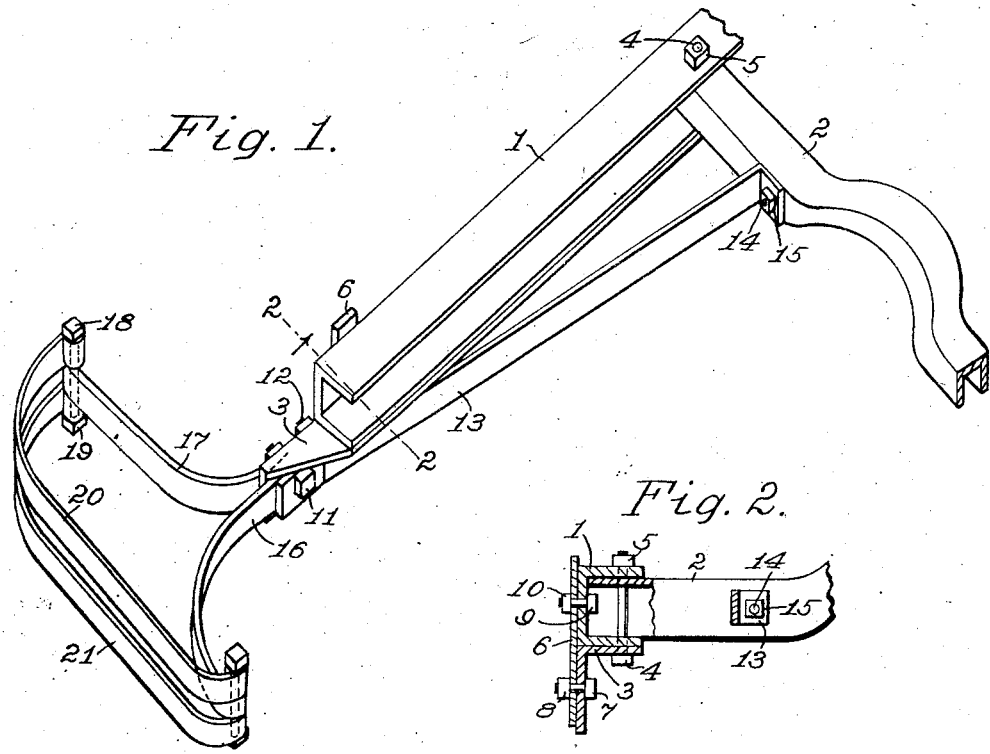
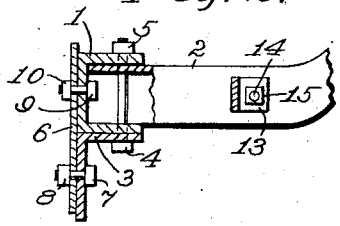
Inventor
*Bennie P. Hanson*
By *Geo. C. Kennedy.*
Attorney Patented Apr. 6, 1926.

1,579,528

UNITED STATES PATENT OFFICE.

BENNIE P. HANSON, OF CEDAR FALLS, IOWA, ASSIGNOR TO EDWARD L. MOORE, OF WATERLOO, IOWA.

MOTOR-VEHICLE BUMPER.

Application filed December 31, 1925. Serial No. 78,600.

*To all whom it may concern:*

Be it known that I, BENNIE P. HANSON, citizen of the United States, residing at Cedar Falls, in the county of Black Hawk and State of Iowa, have invented certain new and useful Improvements in Motor-Vehicle Bumpers, of which the following is a specification.

My invention relates to improvements in motor vehicle bumpers, and the object of my improvements is to supply effective and simple means for rigidly mounting bumpers upon the frames of motor cars, and to effect other improvements in the structures of the buffer elements and their connections in such devices.

These objects I have accomplished by the means which are hereinafter described and claimed, and which are illustrated in the accompanying drawings, it being understood that slight variations in the specific embodiments of said improvements are nevertheless covered by the scope of my invention.

In said drawings, Fig. 1 is a detail perspective view of one of my improved bumpers as mounted upon a frame side-bar of a motor car, and Fig. 2 is a cross section thereof taken on the dotted line 2—2 of said Fig. 1.

My improved bumper is particularly adapted to be mounted on the rear frame parts or side bars of the newer type of Ford cars, in which these parts are carried farther back than in the older models in which latter the rear ends of the channeled side bars terminate opposite the ends of and receive the ends of the rear saddle-bar. My bumper and its attachments, however, may be mounted on other kinds of cars for which it may be adapted for use, or with little alteration within the scope of the invention.

The numeral 1, then, denotes the rear portion of a frame side-bar channeled inwardly to receive one end of the medially arched saddle-bar 2 to be secured by means of a through-bolt 4 and nut 5. This connection is best shown in said Fig. 2.

I supply a pair of like but reversed bumpers for a car, mounted rigidly but removably upon the rearwardly projecting part of each side-bar 1.

Each bumper has means for mounting it upon the side-bar 1, and each bumper has a rigid stem element consisting preferably of an angle-bar 3, which, as shown in Fig. 2, is apposed longitudinally to and along the under flange of the channel-bar 1 to extend from below the saddle-bar 2 to project beyond the terminal of said channel-bar. The said channel-bar, saddle-bar and angle-bar are apertured vertically in alinement to receive a headed bolt 4 secured by a nut 5. To fasten the rear part of the angle-bar 3 to the channel-bar 1, a vertical bar 6 has its lower part fastened to the angle-bar by means of a bolt 7 and nut 8, while its upper part is fastened to the channel-bar 1 by means of a bolt 9 and nut 10.

The numerals 16 and 17 denote bars which are apposed to and along opposite sides of the depending web of the angle-bar 3 beginning at the rear part of the vertical bar 6 in position and projecting rearwardly from the angle-bar to have their rear parts curvilinearly divergent transversely. These bars are fastened to the angle-bar 3 by bolts 11 and nuts 12. An inclined brace-bar 13 has its rear end fastened to the angle-bar by one of the bolts 11, and its forward end is bent angularly and fastened to the saddle-bar 2 by a bolt 14 and nut 15.

Upon the divergent terminations of the bars 16 and 17 are mounted the opposite ends of resilient buffer-bars 20 and 21 in longitudinally spaced superposed parallel positions, their ends, as also the ends of the bars 16 and 17, being bent to form eyes to take hinge-bolts 18 secured by nuts 19, hingedly, the bar-ends of 16 and 17 being intermediate the bar ends of 20 and 21. This provides a yielding resilient bumper structure firmly mounted upon the vehicle frame.

Having described my invention, what I claim as new, and desire to secure by Letters Patent, is:

1. The combination with a vehicle frame side-bar and a cross-bar terminally placed thereacross spaced from one end thereof, of a bumper-stem mounted longitudinally along the side-bar, said side-bar, cross-bar and stem having alined bolt-holes, a bolt traversing said bolt-holes to fasten said elements together, and said bumper-stem having a projecting resilient buffer terminal beyond the end of said side-bar.

2. The combination with a vehicle frame side-bar and a cross-bar terminally placed thereacross spaced from one end thereof, of a bumper-stem mounted longitudinally along the side-bar, means for separably fastening said bumper-stem, side-bar and cross-bar rigidly together, and a pair of transversely arranged resiliently mounted buffer-bars secured upon the free end of said bumper-stem.

3. The combination with a vehicle frame side-bar and a cross-bar terminally mounted thereacross spaced from one end thereof, of a bumper-stem positioned along said side-bar to terminate therebeyond, means for securing one end to said side-bar and cross-bar, other means for securing the other end part of the stem to the side-bar, a brace-bar secured between said stem and said cross-bar, and transversely looped resilient buffer-bars, spaced vertically, and mounted upon the projecting end of said bumper-stem.

4. The combination with a vehicle frame channeled side-bar and a saddle cross-bar terminally mounted thereacross in the channel thereof, of an angle-bar bumper-stem fitted longitudinally along the under face of said side-bar, all said parts being apertured in alinement, fastening-means in said apertures to secure said parts together, a brace-bar secured between said bumper-stem and said cross-bar obliquely, a standard rigidly connecting said bumper-stem and said side-bar, buffer-arms secured to said bumper-stem and diverging transversely, and a pair of spaced transverse buffer-bars having their ends connected to the ends of said buffer-arms.

In testimony whereof I affix my signature.

BENNIE P. HANSON.